(12) United States Patent
Schaefer

(10) Patent No.: US 6,640,253 B2
(45) Date of Patent: Oct. 28, 2003

(54) DYNAMIC LOGICAL CONTROL OF NETWORK UNITS IN AD-HOC COMMUNICATIONS NETWORKS

(75) Inventor: Donald E. Schaefer, Wantagh, NY (US)

(73) Assignee: Symbol Technologies, Inc., Holtsville, NY (US)

(*) Notice: Subject to any disclaimer, the term of this patent is extended or adjusted under 35 U.S.C. 154(b) by 116 days.

(21) Appl. No.: 09/892,394

(22) Filed: Jun. 27, 2001

(65) Prior Publication Data

US 2003/0005160 A1 Jan. 2, 2003

(51) Int. Cl.$^7$ .............................................. G06F 15/16
(52) U.S. Cl. ....................... 709/248; 370/328; 370/329; 370/338
(58) Field of Search ................................. 709/248, 220, 709/221, 222, 223, 224, 228, 229, 249; 370/328, 329, 338, 352, 401; 455/41.2, 41.3

(56) References Cited

U.S. PATENT DOCUMENTS

| | | | | |
|---|---|---|---|---|
| 5,572,528 A | * | 11/1996 | Shuen | 370/402 |
| 5,623,656 A | * | 4/1997 | Lyons | 707/10 |
| 5,717,688 A | * | 2/1998 | Belanger et al. | 370/331 |
| 5,745,483 A | * | 4/1998 | Nakagawa et al. | 370/335 |
| 5,796,394 A | * | 8/1998 | Wicks et al. | 345/751 |
| 5,958,018 A | * | 9/1999 | Eng et al. | 709/246 |
| 6,016,318 A | * | 1/2000 | Tomoike | 370/401 |
| 6,058,422 A | * | 5/2000 | Ayanoglu et al. | 709/226 |
| 6,067,297 A | | 5/2000 | Beach | |
| 6,292,747 B1 | * | 9/2001 | Amro et al. | 701/213 |
| 6,304,556 B1 | * | 10/2001 | Haas | 370/254 |
| 6,359,469 B1 | * | 3/2002 | Mendel et al. | 326/40 |
| 6,405,049 B2 | | 6/2002 | Herrod et al. | |
| 6,415,330 B1 | * | 7/2002 | Okanoue | 709/245 |

* cited by examiner

Primary Examiner—Saleh Najjar
Assistant Examiner—LaShonda Jacobs
(74) Attorney, Agent, or Firm—Carter, DeLuca, Farrell & Schmidt

(57) ABSTRACT

A logical function is executed in addressable units in a wireless local area network based upon the current state value of other units in the network. Depending upon a persistence setting which may be pre-set or programmed into each unit, the logical function may be recomputed at predetermined time intervals, or upon receiving an overriding resetting signal or control packet.

20 Claims, 5 Drawing Sheets

DYNAMIC LOGICAL CONTROL OF NETWORK UNITS IN AD-HOC COMMUNICATIONS NETWORKS

BACKGROUND OF THE INVENTION

1. Field of the Invention

The apparatus and methods consistent with the present invention relates to computer terminals or network addressible units operated in ad hoc wireless networks, and more particularly to the network architecture, configuration software, and inter-network messaging and communications protocols needed to support updating message and synchronization services between network units operated in such networks, and from network to network.

2. Background of the Invention

Wireless and radio frequency (RF) protocols are known which support the logical interconnection of portable roaming terminals having a variety of types of communication capabilities to host computers. The logical interconnections are based upon an infrastructure in which at least some of the remote terminals are capable of communicating with at least two of the access points when located within a predetermined range therefrom, each terminal unit being normally associated with and in communication with a single one of such access points. Based on the overall spatial layout, response time, and loading requirements of the network, different networking schemes and communication protocols have been designed so as to most efficiently regulate the communications between a given terminal and the network through the selected access point. One such protocol is set forth in the ISO/IEC 8802-11, or ANSI/IEEE Std 802.11 entitled "Wireless LAN Medium Access Control (MAC) and Physical Layer (PHY) Specifications" (1999 edition) available from the IEEE Standards Department, Piscataway, N.J. (hereinafter the "IEEE 802.11 Standard").

Prior to the present invention, there has not been a simple, ad hoc network architecture which would allow a user of a network to automatically control the status and operation of network units on a dynamic basis without the use of a controller, master station, or other centralization unit.

SUMMARY OF INVENTION

1. Object of the Invention

It is a general object of the present invention to provide a dynamic logical messaging and communications protocol and network architecture in an ad hoc wireless network.

It is another object of the invention to provide a method for updating and sychronizing network units in a ad hoc network using announcement messages.

It is a further object of the present invention to provide a logical interface between network units in an ad hoc wireless personal area network.

It is another object of the present invention to provide a low cost, consumer wireless ad hoc communications network for controlling light switches, appliances, and other portable or stationary network units.

It is an even further object of the invention to provide a method which can be used to accomplish one or more of the above objectives.

Additional objects, advantages and novel features of the present invention will become apparent to those skilled in the art from this disclosure, including the following detail description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

2. Features of the Invention

The present invention provides a method for providing control signals or updates to network addressable nodes including the steps of periodically broadcasting an announcement message from each network unit, including the state value and user identification information; receiving the announcement message at each node on the network; and processing the state value and the user identification information to determine a new state value for each node based upon the state value of at least one other node. The invention further provides a method of operating an wireless area network in which each unit has a state value at any given time, including the steps of broadcasting from each unit in the network its identity and state value; and receiving in each mobile unit in the network the identity and state value of every other unit and computing a predetermined Boolean expression in each respective mobile unit a new state value based upon the received identities and state values.

The novel features and characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF DRAWINGS

Like reference symbols in the various drawings indicate like elements.

DESCRIPTION OF THE PREFERRED EMBODIMENT

Figure 1:
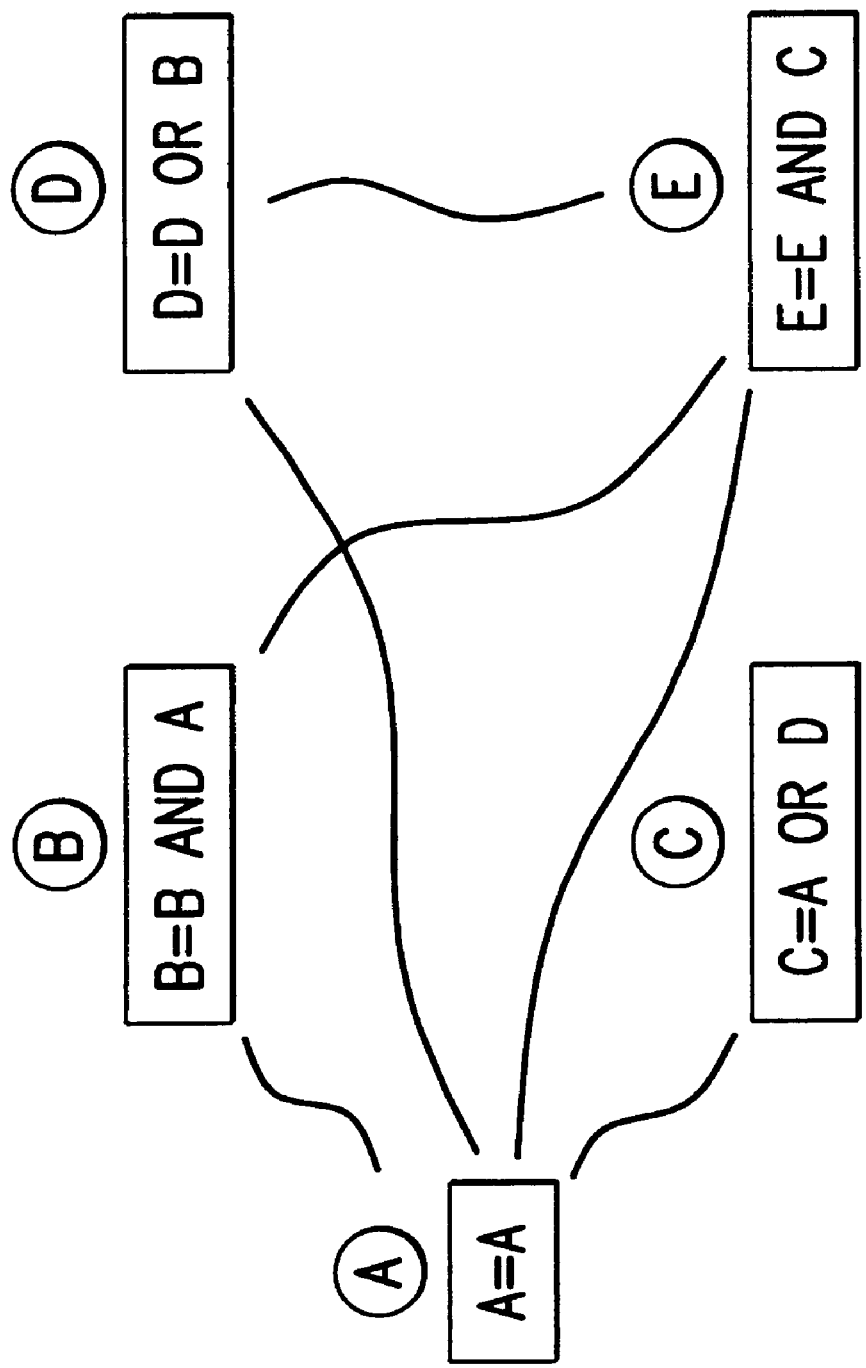
FIG. 1 illustrates a network environment in which the present invention can be implemented.

Referring now to the figures, FIG. 1 shows a diagrammatic representation of a typical networking environment consistent with the present invention in a preferred embodiment of the home, small office, school, or similar public or private space. The physical hardware components reside at the lowermost OSI layer, or physical layer, and include various nodes distributed along the wireless network link. Although the term "node" broadly refers to all types of physical devices attached to the network link, only client or peer nodes are depicted in FIG. 1.

More specifically, FIG. 1 illustrates clients interconnected through network links, although both clients and servers, as well as other types of nodes, may be distributed along the network link as well. As used in this specification, the term "client" will generally denote a peripheral device or network appliance of some type associated with a user. The term "server" includes any device directed for controlling and coordinating shared usage of an network resource, such as an access point, or website content or data source.

FIG. 1 depicts an ad-hoc network of network units A, B, C, D, and E. Each unit has an address or identifier uniquely associated with it, and a state value. In one embodiment, the address may be its media access control (MAC) address, or in Bluetooth networks, a Bluetooth address.

The state value may be in simplest terms a digital 1 or 0, i.e. a single bit. The initial state value may be predetermined, e.g. "0" for off, which may be subsequently changed by the user, either manually by direction action on the mobile unit, or through a wireless transmitted control signal.

The wireless ad hoc network is initiated by each network unit transmitting an announcement message or packet containing its address and state value. The announcement message may also contain timing, clock, or synchronization information. The media access control technique (CSMA/CD, TDMA, etc.) may be selected depending upon the type of network.

Each network unit within a working range of the broadcasting unit will receive the announcement message and process it, storing the identities (or addresses) of the broadcasting units, and this current state value, in tables in memory in the mobile unit. Such table values may be periodically updated as new broadcasts are received.

A logical function is executed in addressable units in a wireless local area network based upon the current state value of other units in the network. Depending upon a persistence setting which may be pre-set or programmed into each unit, the logical function may be recomputed at predetermined time intervals, or upon receiving an overriding resetting signal or control packet.

For example, network unit B executes the Boolean logic function shown in the Figure. If B is a light, it may change state (i.e., go on or off) depending upon the value computed by the logic function. There may be a persistence setting so such value is not changed for a period of time after switching, which may be programmable or varied according to time of day, day of week, or other variables.

Although control switches or network addressible appliances are the preferred network unit, the data units may also include bar-code readers, and may be portable or stationery or worn by the user rather than hand-held. The mobile units 15 may also function as voice communication handsets, pagers, still image or video cameras, cellular telephones, AM/FM radio broadcast receivers, or any combination of the foregoing. Other types of data gathering devices may be utilized as terminals and use the message forwarding features of the invention, such as temperature, pressure, or other biophysical or environmental measuring devices, event counters, voice or sound activated devices, intrusion detectors, etc.

Various other types of network nodes or terminals may be advantageously employed in a system having features of the invention; these portable terminals ordinarily could utilize data entry media such as keyboards, touchscreens, a magnetic cards, RFID tags, biometric sources, SIM devices, smart cards, electronic key (e.g. "Ving") access cards, or the like, as well as a display (or printer) for providing a display of the information detected, transmitted and/or received by the terminal. In this embodiment used as an illustrative example, there may be from one up to sixty-four of the base stations (three stations being shown in the Figure) and up to several hundred of the remote portable units; of course, the network is scalable and may be expanded by merely changing the size of address fields and the like in the digital system, as will appear, but a limiting factor is the RF traffic and attendant delays in waiting for a quiet channel.

Figure 2:
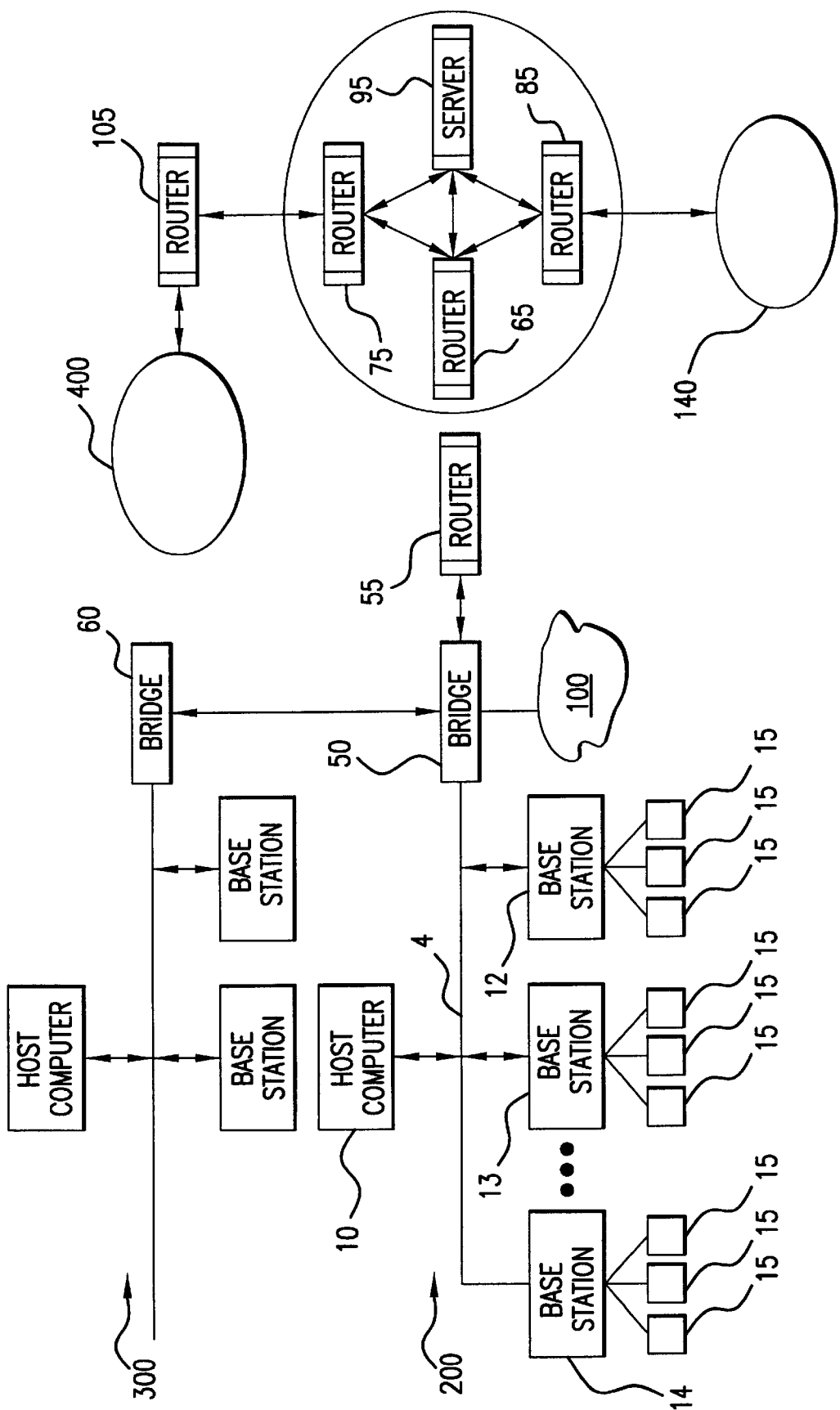
FIG. 2 illustrates the coupling of the ad hoc network to a LAN.

The ad hoc network 100, as shown in FIG. 2, may be coupled to additional LANs 200, 300, 400 etc. through controllers such as bridges 50, 60, etc. or routers 55, 65, 75, 85, etc.

The LAN networks may also include a server 95 which may be associated with an Internet site, and may include a plurality of software components that can be accessed by an agent program. Such components may include one or more object classes including applets, servlets, Java Beans™ etc. or in general any executable unit of code.

The server may be a directory server or standard database management system. The server 95 may include facilities for address translation, formatting, storage, and encryption key management, among others.

Such extensive LAN communications networks, as depicted in FIG. 2, may a also ordinarily be used in a convention centers, manufacturing facility, office building complex, warehouse, retail establishment, shopping malls, or like commercial or public facility, or combination of these facilities, where the data-gathering terminals or mobile units would be used for inventory control in stockroom or receiving/shipping facilities, at checkout (point of sale) counters, for reading forms or invoices of the like, for personnel security checking at gates or other checkpoints, at time clocks, for manufacturing or process flow control, for providing information to customers (such as location, and directions to a site or person) and many other such uses.

An RF packet communications protocol is provided between the remote units and the base stations, and includes a transmit/receive exchange, referred to hereinafter simply as an "exchange". This protocol is similar to collision-sense multiple access (CSMA) in that a unit first listens before transmitting, and does not transmit if the channel is not free. This exchange always begins with a remote-to-base transmitted packet, representing an RF transmission from a remote unit to be received by the base stations within range. The transmitted packet is followed after a fixed time interval by a base-to-remote unit of RF information transmitted by the base station servicing this particular remote unit. Each of these packets is of fixed timing; a transceiver in a remote unit begins an exchange at its own initiative by first listening for other traffic for a brief interval $t_o$ (typically 0.3 msec.) and, if the RF channel is quiet, starting a transmission at a time of its own selection (asynchronous to any clock period of the base stations or host computer). This outgoing transmission packet lasts for a time $t_1$ as seen in the Figure, and in an example embodiment this period is 4.8 milliseconds. Then at a precise time delay $t_2$ after it started transmission (e.g. 5 msec after the beginning of $t_1$ the transceiver begins listening for the return packet from the base station. The transceiver in the remote unit only responds to receipt of the packet beginning in a very rigid time window $t_3$ of a few microseconds length, and if the packet has not started during this window then anything to follow is ignored. The packet is an acknowledge signal, and also contains data if the base station has any message waiting to be sent.

The steps carried out by a mobile unit 15 which is not currently associated to an access point in selecting an access point according to the IEEE 802.11 standard are described as follows. The mobile unit (MU) sends out a probe packet to all access points (APs), typically at the lowest data rate it is otherwise able to use with the network. The probe packet contains the mobile unit source address but has no destination address and hence any access point that detects the probe packet and is capable of responding at the same data rate must send a response. Accordingly, the probe packet is detected by all access points within range and a subset of those access points sends out a probe response packet. An evaluation of the signal quality and possibly other factors is made by the MU of the communications with the most eligible access point (if any) at the highest data rate. If such communications are acceptable, the MU will associate with the selected AP.

If the MU is already associated with an access point and operating at a data rate lower than the highest data rate, then depending upon the performance statistics, it will carry out an update probe at predetermined intervals to see if it can operate at a higher data rate, and associate with a new AP at the higher data rate. Such association with different AP, known as roaming, is typically encountered when the MU is moved in and out of range, e.g. to and from the periphery of the range of the original of AP, but may occur even if the mobile unit is motionless during conditions of fluctuations in traffic on the AP with which the MU is associated.

The MU can be used for a variety of information retrieving and computing purposes including but not limited to Internet access, data base lookup, order entry, messaging, document preparation and word processing, scheduling, mathematical computation, and the like. For these purposes, MU are provided with operating system software. In an embodiment, the operating system can be Windows 9x, Windows 2000, CE or NT platforms. In other embodiments, the operating system can be Mac OS, Palm OS, or Linux. In one embodiment, the memory 341 can be random access memory into which the operating system is loaded. In another embodiment, the memory 341 can be any type of firmware such as EPROM or EEPROM into which the operating system is "burned".

Figure 3:
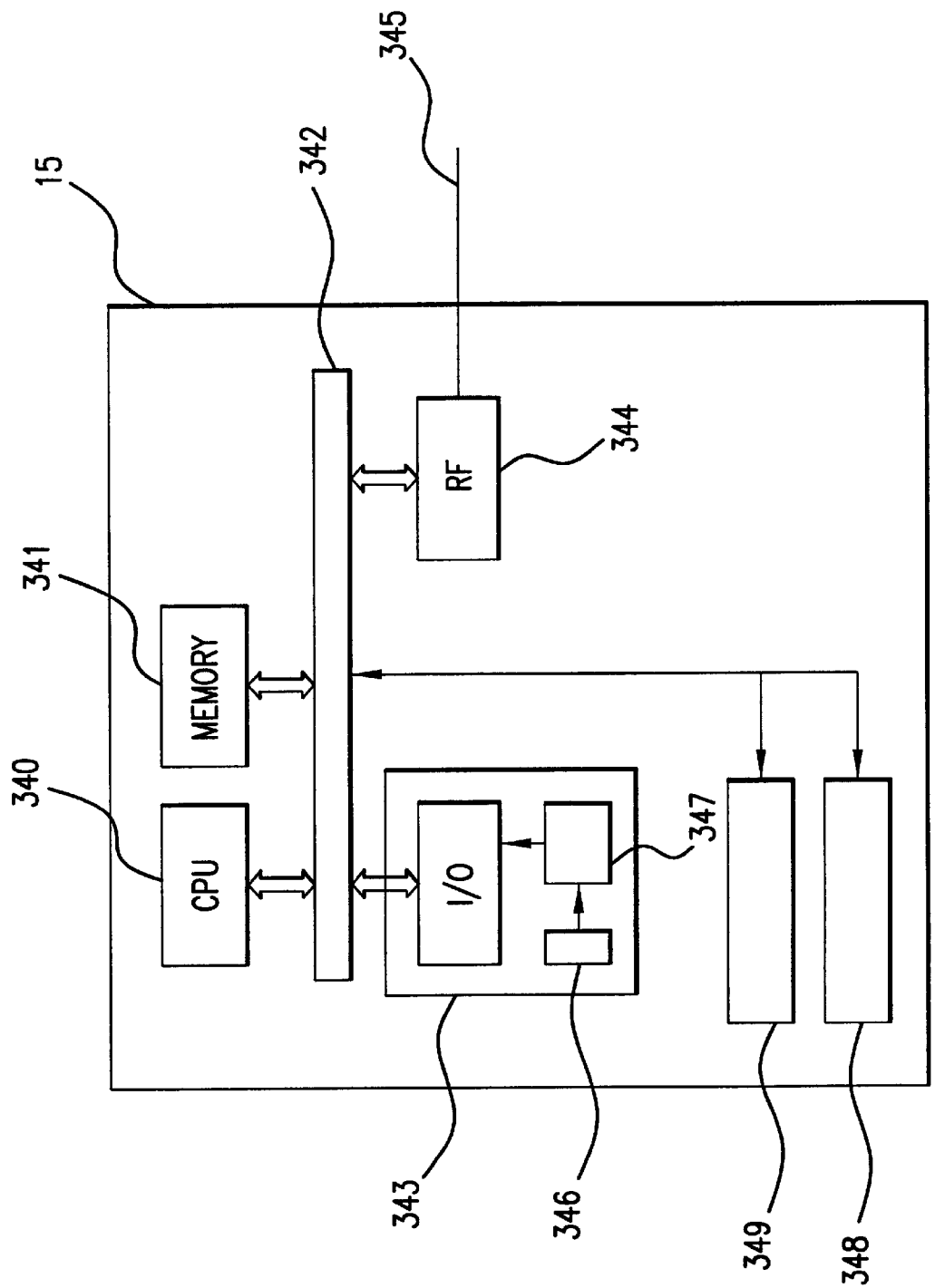
FIG. 3 illustrates a block diagram of a network unit.

FIG. 3 illustrates a detailed view of a remote unit 15. The remote unit 15 includes a CPU 340 connected to a local bus 342. A memory 341 is also connected to the local bus 342, and can provide instructions to the CPU 340. A peripheral bar code data acquisition device 343 is optionally coupled to the CPU via the bus 342. The device 343 can be used to detect and/or decode data from a bar code (not shown). The device 343 can be used to input data from a photodetector device 345 that produces a serial electrical signal fed to a decoder 347 responding to the characteristic patterns of bar code symbols and providing bar code data to the memory 341 via device 343 when a bar code is scanned. The bar code data can be moved to memory by a variety of techniques such as direct memory access (DMA) or CPU instructions. Ultimately the bar code data is transferred to an RF transceiver 344 for transmission to the base unit 12, 13, 14 and ultimately the host computer 10. The RF transceiver 344 is coupled to and controlled by the CPU through the bus 342, and transmits the RF signal through an antenna 345 or detects and converts RF signals received by the antenna 345.

Typically, the remote unit 15 has a manual entry device 348 such as a keyboard, and a visual display 349 such as a liquid crystal display (LCD) device. The elements of the entry device 348 and the display 349 are scanned by signals generated in the CPU 340, or generated in a entry device and display I/O controller. In one embodiment, the I/O controller is an Intel® 8052 microcontroller.

Figure 4:
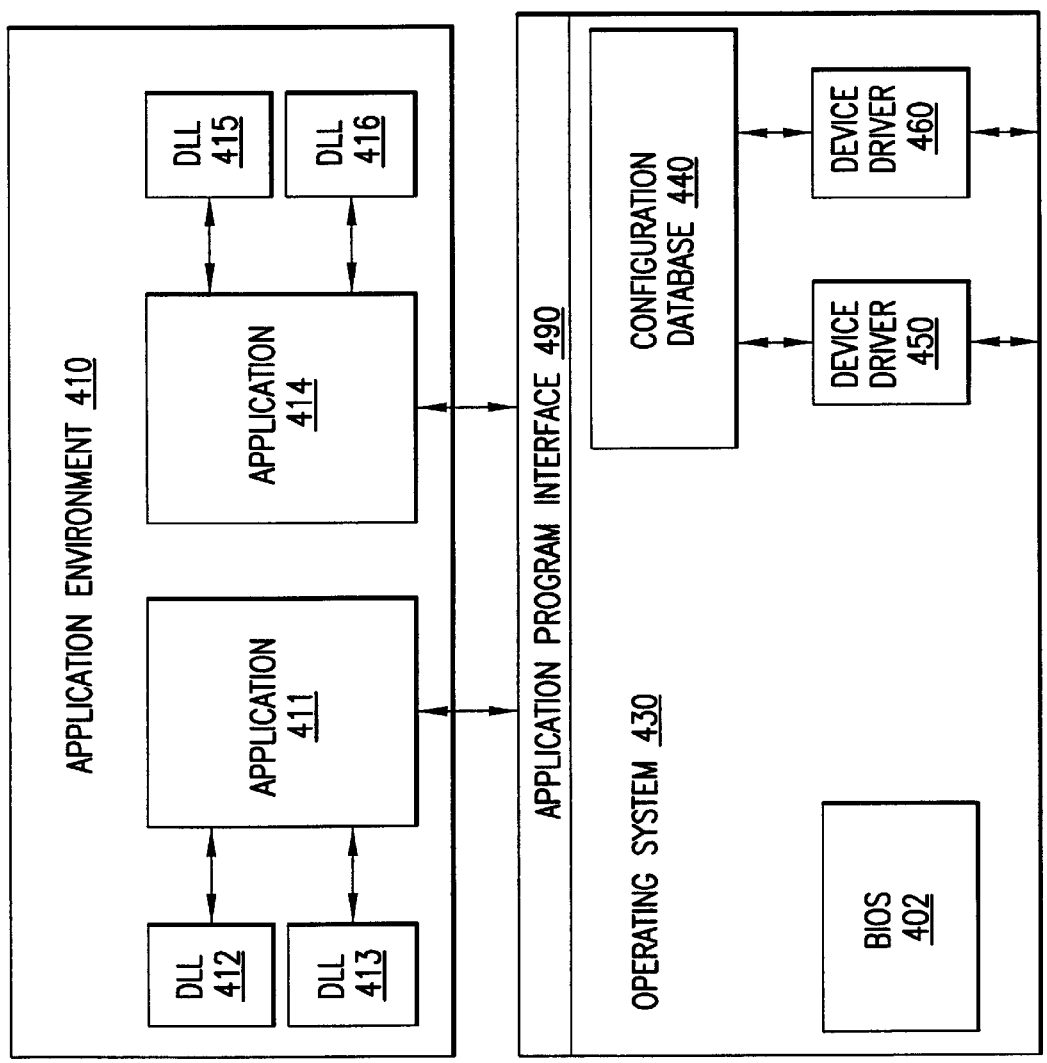
FIG. 4 illustrates an operating system and application environment in the network unit.

FIG. 4 illustrates an operating system having an application environment. As discussed above the operating system 430 can be one of the various Windows environments. The operating system 430 provides software to manage configure, enable and allocate physical resources of the MU 15. For example, the operating system 430 may include a memory allocation algorithm to allocate the memory 341 among various software tasks. Additionally, the operating system includes instructions from the memory to control the RF transmissions and receptions as well as data flow between the data acquisition device 343 and the RF transceiver 344.

An application environment 410 contains one or more software application processes 411, 414. The applications 411, 414 can be any variety of applications for use on the remote unit 15. For example, the application 411 can be a browser for connecting to a network such as the Internet. The application 414 can be a configuration program that configures the remote unit 15 for use with the network to which the remote unit 15 connects.

Each application 411, 414 can have one or more processes 412, 413, 415, 416 respectively, associated with them. These processes can serve a variety of purposes related to the applications 411, 414. For example, one or more of the processes can be a dynamic link library (DLL) 412, 413, and 415, 416 respectively associated with it. A DLL is a feature of Windows platform that allow executable code modules to be loaded on demand and dynamically, and linked at run time. Library code can be updated, transparent to the application 411, 414, and unloaded when no longer needed.

The operating system 430 can include an application programming interface 490 (API). The API 490 is the software that the application processes 411, 414 use to request and carry out lower level services performed by the operating system 430. For Windows, the API also helps applications 411, 414 manage windows, menus, icons and other graphical user interface (GUI) elements. The API 490 includes a set of standard software interrupts, calls and data formats applications 411, 414 use to initiate contact with device drivers 450, 460.

The operating system 430 can include one or more device drivers 450, 460. The device drivers 450, 460 provide control functionally specific to a particular physical device or class of devices. Additionally, the device drivers 450, 460 provides standard software interfaces allowing other system components to access the controlled device. For example, one device driver 450 can control the code data acquisition device 343 and provide data to and from applications 411, 414 through the API 490. The other device driver 460 can control the RF transceiver 344 that allows data to be transferred from operating system 430 to the RF transceiver 344 through device driver 460. Operating system 430 also includes a BIOS 402 to run standard start up routines for the remote unit 15.

A variety of application programs can be included in the operating system. One such application according to the present invention is a manual activation and radio activation program. Such an application program derives data from manual activation of a switch, and places the switch state in a message for automatic transmission by the RF transceiver. A key aspect of the present invention is that such operations may be done automatically through the use of an configuration program in which a profile has been created to automatically transmit the data to other nodes, the Internet or other network website for further processing at a server 95, such as for deriving destination address and hand-off to another type of network. This configuration program can enable a user to store configurations for numerous networks such that when a user turns on the network unit 15, the program automatically loads the correct configuration to communicate with each destination station that the unit 15 may wish to send a message.

Figure 5:
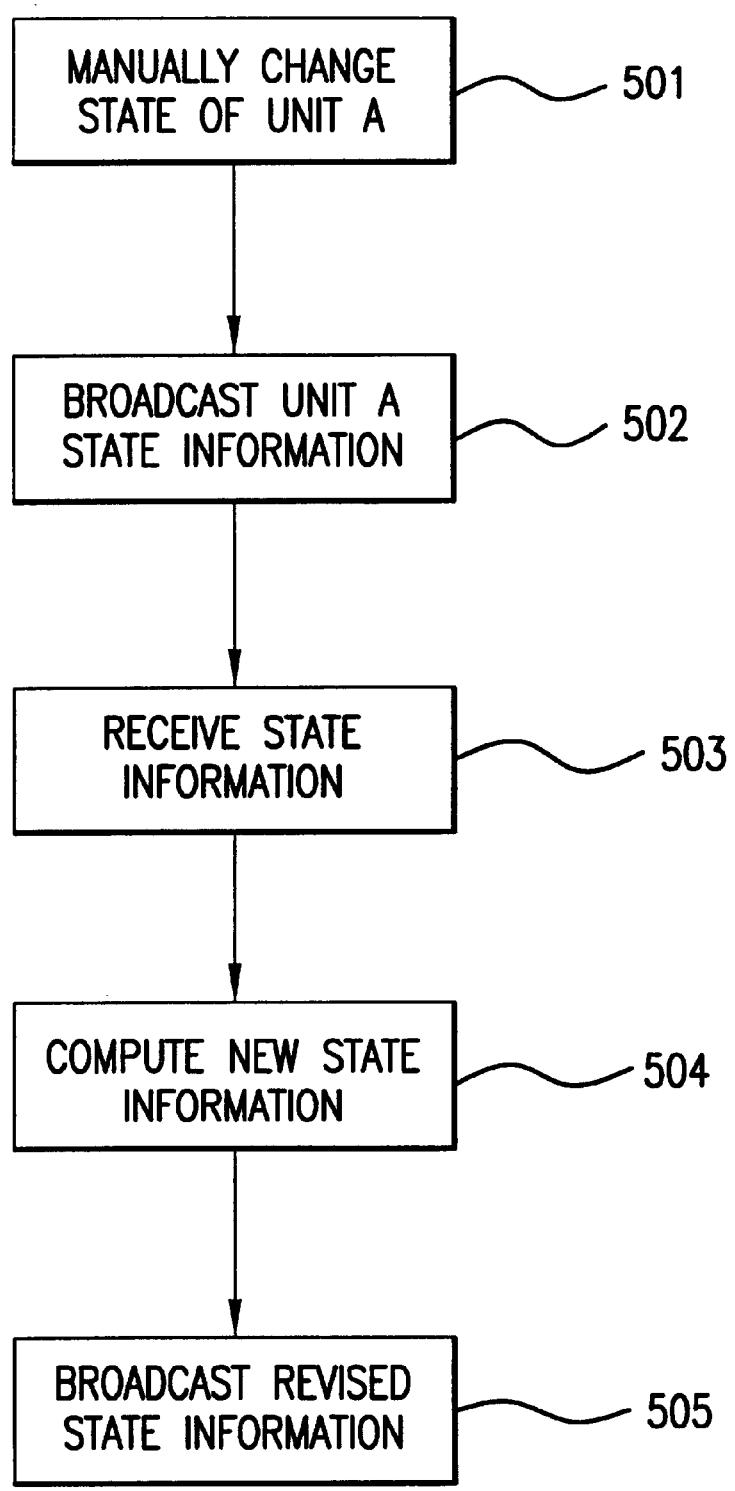
FIG. 5 illustrates a process flow diagram of a network updating system according to the present invention.

FIG. 5 is a flow diagram of the processing of updating units in an ad hoc network according to the present invention. We assume a configuration such as shown in FIG. 1, and that the process is initiated by the user manually changing the state of unit A, e.g. by flipping a switch, 501. Unit A then broadcasts its state information into the air 501, and the signal is received by nearby units B, C, D, and E, 503. According to a predetermined schedule, the received state values will be stored in each unit until computation of the new state value is scheduled for each unit. Each unit may be scheduled independently, at different update rates, depending upon the type of unit or its application. At such time, the new state value is computed in the nearby units, 504. Then, again according to a predetermined schedule, the revised state values in each of the units will be broadcast, 505. As the broadcast state values are received in nearby units, the process repeats itself as at step 503.

Another feature of the present invention is to provide a graphical user interface which enables a user to develop a specify scanning, paging, or other notification operational parameters for a network unit through the use of icons, buttons, meters, slides, or other objects implemental on a interactive display. More particularly, the present invention may also provide an interactive display to the user depicting a graph or list of the servers, networks, or users, wherein points represent mobile units, network nodes, gateways, service providers, radio paging services, or other well known designated network units together, while lines represent channels, links, or other connectivity media. The user may define the architecture by pointing and clicking, or drag and dropping, on such objects on the display as is well known in the art. so as to achieve the desired control architecture and activation schedule. One such architecture is specified by a user or network manager, it may be exported or broadcast as a software file to the actual various network elements represented, along activation schedules, to indicate the duration, context, or other bounds with which the network service is to be configured.

In addition to the ad hoc network configuration by a user, by interacting with a graphical user interface, the present invention also allows the automatic reconfiguration of a network "on the fly", or adaptively in response to changing traffic patterns, instructions in signal protocols, or the like. Resident software modules at each network node may adaptively configure the network node or channel links attached to the network node, according to levels or type of incoming traffic, or in response to signaling protocols. Such adaptation may take place through the use of separate signaling channels or through the use of management packets addressed to a specific network node and designed to reconfigure that network node in connection with a specific session or traffic condition. In addition to the foregoing, the network node may also be reconfigured for a series or set of packets, i.e. in the context for providing higher quality of service to particular identified set of packets while providing normal quality of service to all other packets. One application of the foregoing is to achieve uniformity in the quality of service from end to end, along each network link from source to destination regardless of the particular packet path chosen or network nodes encountered during the transmission from source to destination. The exporting or automatic installation of software modules in network nodes or mobile units according to the present invention is one suitable method for achieving such "on the fly" adaptive network configuration.

Various aspects of the techniques and apparatus may be implemented in digital circuitry, or in computer hardware, firmware, software, or in combinations of them. Apparatus of the invention may be implemented in computer products tangibly embodied in a machine-readable storage device for execution by a programmable processor, or on software located at a network node or web site which may be downloaded to the computer product automatically or on demand. The foregoing techniques may be performed, for example, single central processor, a multiprocessor, one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

It will be understood that each of the elements described above, or two or more together, also may find a useful application in other types of constructions differing from the types described above.

While the invention has been illustrated and described as embodied in a ad hoc communications network, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letter Patent is set forth in the appended claims:

1. A method of operating a wireless area network in which each unit has a state value at any given time, comprising the steps of:
  broadcasting from each unit in the network its network-associated address and state value; and
  receiving in each mobile unit in the network the network-associated address and state value of every other unit and computing a predetermined Boolean expression in each respective mobile unit a new state value based upon the received addresses and state values.

2. The method of claim 1, wherein one node on the network is a distribution node which is an Internet website.

3. The method of claim 1, wherein the step of broadcasting comprises the step of broadcasting from each unit in the network its identity and state value as an announcement broadcast in the form of a radio signal.

4. The method of claim 1, wherein the step of broadcasting comprises the step of broadcasting from each unit in the network information on the location of the unit.

5. The method of claim 2, wherein the distribution node includes a database containing address information for each network unit.

6. The method of claim 2, wherein the distribution node on the network is a stationary access point in a wireless local area network.

7. The method of claim 1, wherein the step of broadcasting comprises the step of broadcasting from each unit in the network an announcement broadcast in the form of a HTML script.

8. The method of claim 1, further comprising the step of providing access to a network page through a URL containing appropriate query strings necessary to present the network page to a destination station.

9. The method of claim 8, wherein a radio signal identifies the user to the destination station.

10. The method of claim 1, wherein the network is an ad hoc network.

11. A method for providing control signals to network addressable nodes in a wireless area network, comprising the steps of:

broadcasting an announcement message from each node in the network including a state value corresponding to each respective node;

receiving the announcement message at each node in the network; and processing the state value to determine a new state value for each node based upon the state value of at least one other node.

12. The method of claim 11, further comprising the step of broadcasting another announcement message from each node in the network including the new state value corresponding to each respective node.

13. The method of claim 11, wherein the step of broadcasting comprises the step of periodically broadcasting the announcement message.

14. The method of claim 11, wherein one node in the network is a distribution node which includes a database containing address information for each node.

15. The method of claim 14, wherein the distribution node is a stationary access point in a wireless local area network.

16. The method of claim 11, wherein the step of broadcasting comprises the step of broadcasting the announcement message in the form of a radio signal.

17. The method of claim 11, wherein the step of broadcasting comprises the step of broadcasting the announcement message in the form of a HTML script.

18. The method of claim 11, wherein the step of broadcasting comprises the step of broadcasting from each node in the network information on the location of the node.

19. The method of claim 11, further comprising the step of providing a setting for maintaining the state value for a given node until an overriding reset signal is received.

20. The method of claim 11, further comprising the step of providing a setting for maintaining the state value for a given node for a predetermined time period.

* * * * *